US009034800B2

(12) United States Patent
Harris et al.

(10) Patent No.: US 9,034,800 B2
(45) Date of Patent: May 19, 2015

(54) FLUID LOSS ADDITIVES AND METHODS OF MAKING AND USING SAME

(75) Inventors: Jeffery R. Harris, Tulsa, OK (US); Frank E. Evans, Bartlesville, OK (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 30 days.

(21) Appl. No.: 13/250,882

(22) Filed: Sep. 30, 2011

(65) Prior Publication Data

US 2013/0085086 A1 Apr. 4, 2013

Related U.S. Application Data

(63) Continuation-in-part of application No. 13/248,715, filed on Sep. 29, 2011, now Pat. No. 8,575,072.

(51) Int. Cl.
*C09K 8/502* (2006.01)
*C09K 8/32* (2006.01)
*C09K 8/64* (2006.01)

(52) U.S. Cl.
CPC . *C09K 8/502* (2013.01); *C09K 8/32* (2013.01); *C09K 8/64* (2013.01)

(58) Field of Classification Search
CPC .......................................... C09K 8/32
USPC ........................................ 507/125
See application file for complete search history.

(56) References Cited

U.S. PATENT DOCUMENTS

| | | | |
|---|---|---|---|
| 2,763,612 A | 9/1956 | Raifsnider et al. | |
| 2,977,334 A | 3/1961 | Zopf et al. | |
| 2,979,454 A | 4/1961 | Fields et al. | |
| 3,346,489 A | 10/1967 | Dickson et al. | |
| 3,708,555 A | 1/1973 | Gaylord | |
| 3,910,856 A | 10/1975 | Kruka et al. | |
| 4,436,636 A | 3/1984 | Carnicom | |
| 4,444,817 A | 4/1984 | Subramanian | |
| 4,816,551 A | 3/1989 | Oehler et al. | |
| 5,032,296 A | 7/1991 | Patel | |
| 6,159,906 A | 12/2000 | McNally et al. | |
| 6,514,916 B1 | 2/2003 | Clampitt et al. | |
| 6,730,637 B1 | 5/2004 | Stewart et al. | |
| 6,800,594 B2 | 10/2004 | Miksic et al. | |
| 6,849,581 B1 * | 2/2005 | Thompson et al. | 507/118 |
| 6,908,888 B2 * | 6/2005 | Lee et al. | 507/219 |
| 7,008,907 B2 | 3/2006 | Kirsner et al. | |
| 7,101,829 B2 | 9/2006 | Guichard et al. | |
| 7,341,106 B2 | 3/2008 | Reddy et al. | |
| 7,345,010 B2 | 3/2008 | Thompson et al. | |
| 7,449,430 B2 | 11/2008 | Guichard et al. | |
| 7,740,070 B2 * | 6/2010 | Santra et al. | 166/300 |
| 7,741,250 B2 | 6/2010 | Patel et al. | |
| 7,943,554 B2 | 5/2011 | Duncum et al. | |
| 8,575,072 B2 | 11/2013 | Harris et al. | |
| 2002/0189810 A1 * | 12/2002 | DiLullo et al. | 166/294 |
| 2007/0062698 A1 * | 3/2007 | Smith et al. | 166/279 |
| 2007/0265172 A1 * | 11/2007 | Patel et al. | 507/221 |
| 2009/0035244 A1 | 2/2009 | Rando et al. | |
| 2010/0222240 A1 | 9/2010 | Patel et al. | |
| 2011/0146983 A1 * | 6/2011 | Sawdon | 166/276 |
| 2013/0085085 A1 * | 4/2013 | Harris et al. | 507/125 |
| 2013/0085086 A1 * | 4/2013 | Harris et al. | 507/125 |

FOREIGN PATENT DOCUMENTS

| | | |
|---|---|---|
| EP | 0922743 A1 | 6/1999 |
| EP | 1431368 A1 | 6/2004 |
| EP | 2154224 A1 | 2/2010 |
| GB | 2157744 A | 10/1985 |
| WO | 9422957 A1 | 10/1994 |
| WO | 9732946 A1 | 9/1997 |
| WO | 2007134200 A2 | 11/2007 |
| WO | 2007134200 A3 | 11/2007 |
| WO | 2009005503 A1 | 1/2009 |

OTHER PUBLICATIONS

Foreign communication from a related counterpart application—International Search Report and Written Opinion, PCT/US2012/052674, Nov. 5, 2012, 12 pages.
Foreign communication from a related application—International Search Report and Written Opinion, PCT/US2007/068721, Nov. 6, 2007, 9 pages.
Foreign communication from a related application—International Preliminary Report on Patentability, PCT/US2007/068721, Nov. 11, 2008, 7 pages.
Office Action dated Nov. 5, 2010 (13 pages), U.S. Appl. No. 12/778,674, filed May 12, 2010.
Office Action (Final) dated Apr. 14, 2011 (10 pages), U.S. Appl. No. 12/778,674, filed May 12, 2010.

* cited by examiner

*Primary Examiner* — Gregory Webb
(74) *Attorney, Agent, or Firm* — Rodney B. Carroll; Chad E. Walter; Conley Rose, P.C.

(57) ABSTRACT

A non-aqueous wellbore servicing fluid comprising a fluid loss additive wherein the fluid loss additive comprises the reaction product of (i) a functional polymer and (ii) an oligomerized fatty acid. A method of conducting an oil-field operation comprising placing a non-aqueous wellbore servicing fluid downhole wherein the non-aqueous wellbore servicing fluid comprises a fluid loss additive comprising the reaction product of (i) a functional polymer and (ii) an oligomerized fatty acid.

20 Claims, No Drawings

FLUID LOSS ADDITIVES AND METHODS OF MAKING AND USING SAME

CROSS-REFERENCE TO RELATED APPLICATIONS

This is a continuation-in-part application of U.S. patent application Ser. No. 13/248,715 filed Sep. 29, 2011 and entitled "Fluid Loss Additives and Methods of Making and Using Same," which is incorporated herein in its entirety.

TECHNICAL FIELD OF THE INVENTION

This disclosure relates to wellbore servicing fluids. More specifically, this disclosure relates to non-aqueous wellbore servicing fluids.

BACKGROUND

Subterranean deposits of natural resources such as gas, water, and crude oil are commonly recovered by drilling wellbores to tap subterranean formations or zones containing such deposits. Various fluids are employed in drilling a wellbore and preparing the wellbore and an adjacent subterranean formation for the recovery of material therefrom. For example, a drilling fluid or mud is usually circulated through a wellbore as it is being drilled to cool the bit, keep deposits confined to their respective formations during the drilling process, and bring drill cuttings to the surface.

One challenge to the recovery of natural resources from subterranean formations is the permeability of the formation in which these deposits reside. Particularly due to the presence of permeable zones, at least a portion of the fluids introduced to the subterranean formation during a wellbore servicing operation may be lost to the permeable zones of the formation. The loss of these wellbore servicing fluids to the subterranean formation can present a variety of challenges such as the cost of replacing the lost wellbore servicing fluids; the impact of the wellbore servicing fluids on the formation surrounding the wellbore; and the potential loss of function provided by the presence of a less than process-desired amount of fluid in the wellbore. Therefore, an ongoing need exists for materials to reduce the loss of wellbore servicing fluids to the surrounding formation.

SUMMARY

Disclosed herein is a non-aqueous wellbore servicing fluid comprising a fluid loss additive wherein the fluid loss additive comprises the reaction product of (i) a functional polymer and (ii) an oligomerized fatty acid.

Also disclosed herein is a method of conducting an oil-field operation comprising placing a non-aqueous wellbore servicing fluid downhole wherein the non-aqueous wellbore servicing fluid comprises a fluid loss additive comprising the reaction product of (i) a functional polymer and (ii) an oligomerized fatty acid.

DETAILED DESCRIPTION

Disclosed herein are wellbore servicing fluids comprising a fluid loss additive (FLA) wherein the fluid loss additive comprises the reaction product of (i) an oligomerized fatty acid and (ii) a functional polymer. As used herein, a "wellbore servicing fluid" (WSF) refers to a fluid that may be used to prepare a wellbore or a subterranean formation penetrated by the wellbore for the recovery of material from the formation, for the deposit of material into the formation, or both. Thus, the WSF may serve as, for example, a drilling fluid, a workover fluid, a fracturing fluid, or a sweeping fluid. In an embodiment, the WSF is a drilling fluid, for example, a non-aqueous drilling fluid. It is to be understood that "subterranean formation" encompasses both areas below exposed earth or areas below earth covered by water such as sea or ocean water. The WSFs disclosed herein may display a reduced fluid loss when introduced to a wellbore.

In an embodiment, the FLA comprises the reaction product of a functional polymer. Herein, a functional polymer refers to a polymer comprising functional groups which can serve as sites for attachment of the oligomerized fatty acid to the functional polymer backbone. In an embodiment, any functional polymer comprising functional groups which can serve as sites for attachment of the oligomerized fatty acid to the functional polymer backbone is suitable for use in the present disclosure. In an embodiment, the functional polymer is a copolymer of one or more alpha-olefin monomers and an acid anhydride, alternatively the functional polymer is a copolymer of one or more vinyl monomers and an acid anhydride, alternatively the functional polymer is a maleic anhydride copolymer. Hereinafter the disclosure will refer to the use of a maleic anhydride copolymer as the functional polymer however it is to be understood that other functional polymers of the type disclosed herein are contemplated for use in the present disclosure.

In an embodiment, a functional polymer suitable for use in the present disclosure has an average molecular weight of from about 10,000 Daltons to about 500,000 Daltons; alternatively from about 40,000 Daltons to about 450,000 Daltons or alternatively from about 50,000 Daltons to about 400,000 Daltons. In an embodiment, the functional polymer is a maleic anhydride copolymer which has a maleic anhydride content of from about 10% to about 90% based on the total weight of the polymer, alternatively from about 25% to about 75%; or about 50%. Nonlimiting examples of maleic anhydride copolymers suitable for use in the present disclosure include polystyrene-co-maleic anhydride (as represented generally by structure I), polyethylene-co-maleic anhydride (as represented generally by structure II), poly-1-octadecene-co-maleic anhydride (as represented generally by structure III), or combinations thereof. In Structure I, Structure II, and Structure III, x, y, m, or n can assume any values that allow the copolymer to fall within the disclosed molecular weight ranges. For example, x, y, m, or n can range from about 50 to about 5000, alternatively from about 500 to about 4500 or alternatively from about 1000 to about 4000.

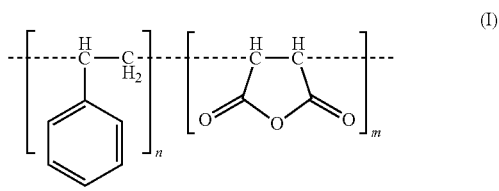

(I)

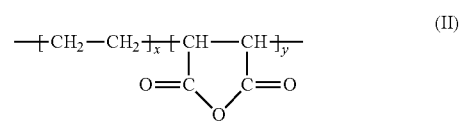

(II)

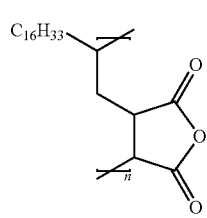

(III)

In an embodiment, the FLA comprises the reaction product of an oligomerized fatty acid, alternatively a dimer acid. Herein, the term dimer acid is synonymous with the term dibasic acid and refers to an oligomeric fatty acid product that is the result of the self-condensation of two unsaturated fatty acids. In an embodiment, the two unsaturated fatty acids involved in the self-condensation to form the dimer acid are the same, alternatively the two unsaturated fatty acids involved in the self-condensation to form the dimer acid are different.

In an embodiment, each unsaturated fatty acid participating in the self-condensation reaction comprises any number of carbon atoms. Alternatively, unsaturated fatty acids suitable for use in the present disclosure when self-condensed result in an oligomeric fatty acid product that is in liquid form or is capable of being readily solubilized. Herein, "readily solubilized" refers to the ability of the oligomeric fatty acid to solubilize in organic media that is compatible with the functional polymer to be modified. In an embodiment, the unsaturated fatty acid comprises a C12-C24 unsaturated fatty acid, alternatively a C14-C22 unsaturated fatty acid, or alternatively a C14-C18 unsaturated fatty acid. In an embodiment, the unsaturated fatty acid comprises a C14-18 unsaturated fatty acid.

The unsaturated fatty acids used to form the dimer acid may be obtained from any suitable source. In an embodiment, the unsaturated fatty acids which are used to form the dimer acid are C14-C18 unsaturated fatty acids obtained from tall oil; for example tall oil fatty acids such as abietic acids and/or pimaric acids. In an alternative embodiment, the C14-C18 unsaturated fatty acids used to form the dimer acid include without limitation linoleic acid, linelaidic acid, linolenic acid or combinations thereof. The C14-C18 unsaturated fatty acids may be obtained from vegetable oils such as soybean oil, corn oil, sunflower seed oil, or rapeseed oil. Other vegetable oils that may provide unsaturated fatty acids which can be used to form the dimer acids of this disclosure include without limitation canola oil, safflower oil, cuphea oil, coconut oil, palm kernel oil, olive oil, or combinations thereof.

In an embodiment, a dimer acid of the type disclosed herein may be formed by contacting a first C14-C18 unsaturated fatty acid with a second C14-C18 unsaturated fatty acid under conditions suitable for self condensation of the first and second unsaturated fatty acids and the formation of an oligomerized fatty acid product. The reaction may be carried out in the presence of a catalyst or catalyst system. Any catalyst or catalyst system compatible with the reaction components disclosed herein may be employed. In an embodiment, the catalyst is a clay and is present in an amount sufficient to catalyze the production of the oligomerized fatty acid product. Herein, the term "clay" refers to a group of rock-forming, hydrous aluminum silicate. In an embodiment, the reaction for formation of a dimer acid is carried out in the presence of montmorillonite which serves as a catalyst in the reaction.

As will be understood by one of ordinary skill in the art, various reaction product features such as the yield of the oligomerized fatty acid and the degree of oligomerization of the unsaturated fatty acids will be affected by various reaction conditions such as the ratio of the first C14-C18 unsaturated fatty acid to the second C14-C18 unsaturated fatty acid, the nature of the C14-C18 unsaturated fatty acids, the reaction temperature and reaction time. It is contemplated that one of ordinary skill in the art given the benefits of this disclosure can alter the reaction conditions for formation of the dimer acid to meet one or more user and/or process needs.

In an embodiment, a method of producing a FLA comprises contacting a maleic anhydride copolymer and a dimer acid, both of the types disclosed herein, to form a reaction mixture; subjecting the reaction mixture to conditions suitable for the formation of a reaction product and recovering the reaction product.

In an embodiment, the maleic anhydride copolymer is present in the reaction mixture in an amount that constitutes from about 20% to about 80% by weight of the reaction mixture while the dimer acid is present in an amount that constitutes from about 80% to about 20% by weight of the reaction mixture. Alternatively, the maleic anhydride copolymer is present in the reaction mixture in an amount that constitutes from about 40% to about 60% by weight of the reaction mixture while the dimer acid is present in an amount that constitutes from about 60% to about 40% by weight of the reaction mixture. Alternatively the maleic anhydride copolymer is present in the reaction mixture in an amount that constitutes about 50% by weight of the reaction mixture while the dimer acid is present in an amount that constitutes about 50% by weight of the reaction mixture. In an embodiment, the ratio of maleic anhydride copolymer to dimer acid may range from about 1:4 to about 4:1; alternatively from about 3:2 to about 2:3 or alternatively about 1:1. Reaction conditions suitable for the formation of a reaction product from a reaction mixture comprising the disclosed amounts of maleic anhydride copolymer and dimer acid are a temperature of from about 100° C. to about 225° C., alternatively from about 150° C. to about 200° C., or alternatively from about 170° C. to about 190° C. for a time period of from about 1 hour to about 6 hours, alternatively from about 2 hours to about 5 hours or alternatively from about 3 hours to about 4 hours.

Without wishing to be limited by theory, it is contemplated that the reaction conditions disclosed herein result in a reaction product wherein the dimer acid is grafted onto the backbone of the maleic anhydride copolymer at the functional groups (e.g., maleic acid anhydride moieties) of the polymer which serve as sites of attachment. While the exact structure of the reaction product remains to be elucidated, it is contemplated that the reaction product comprises the condensation product of the dimer acid and maleic anhydride copolymer where the anhydride rings of the functional polymer open and are covalently bonded to the dimer acid. In some embodiments, the reaction product of a dimer acid and a maleic anhydride functional copolymer contacted under the conditions disclosed herein comprises an aliphatic anhydride which is the result of the ring opening of the anhydride functional groups present in the functional polymer. As will be understood by one of ordinary skill in the art, the choice of alternative reaction conditions may result in the formation of a variety of reaction products which may display features characteristic of a FLA of the type disclosed herein. Thus, the extent to which the aliphatic anhydride is present in the reaction product may vary and it is contemplated that the FLA comprises the reaction product of the dimer acid and functional polymer when reacted under the disclosed conditions without regard to the exact nature of or structure of the reaction product(s) formed.

In some embodiments, the method of forming a FLA of the type disclosed herein further comprises separating the constituents of the reaction product of the dimer acid and maleic anhydride copolymer and characterizing the abilities of the constituents of the reaction product to function as a fluid loss additive. In such an embodiment, the constituents of the reaction product may be separated using any suitable technique and the extent to which the individual constituents of the reaction product are purified may vary. In some embodiments, one or more of the individual constituents of the reaction product are characterized as FLAs having the ability to inhibit the loss of a wellbore servicing fluid to a formation.

In an embodiment, the WSF is a non-aqueous WSF. As used herein, a non-aqueous WSF includes fluids that are comprised entirely or substantially of non-aqueous fluids and/or invert emulsions wherein the continuous phase is a non-aqueous fluid. In an embodiment, the non-aqueous WSF comprises less than about 30%, 25%, 20%, 16%, 10% or 1% water by weight of the WSF. Alternatively, the WSF composition may contain a balance of the non-aqueous fluid after taking other components of the fluid composition into account.

In an embodiment, the WSF comprises an oleaginous fluid. Alternatively, the WSF after taking other components of the fluid composition into account may consist essentially of an oleaginous fluid. Alternatively, the WSF after taking other components of the fluid composition into account may consist of an oleaginous fluid. Oleaginous fluids herein refer to fluids comprising substantially no aqueous component. Examples of oleaginous fluids suitable for use in the WSF include without limitation hydrocarbons, olefins, internal olefin based oils, mineral oil, kerosene, diesel oil, fuel oil, synthetic oil, linear or branched paraffins, esters, acetals, mixtures of crude oil, derivatives thereof, or combinations thereof.

In an embodiment, the WSF is an oil-based drilling mud. In some embodiments, the WSF may comprise additional additives as deemed appropriate for improving the properties of the fluid. Such additives may vary depending on the intended use of the fluid in the wellbore. Examples of such additives include, but are not limited to, weighting agents, glass fibers, carbon fibers, suspending agents, conditioning agents, dispersants, water softeners, oxidation and corrosion inhibitors, bacteriacides, thinners, and combinations thereof. These additives may be introduced singularly or in combination using any suitable methodology and in amounts effective to produce the desired improvements in fluid properties.

In an embodiment, the FLA is present in the WSF in an amount of from about 0.3 weight percent (wt. %) based on the total weight of the WSF to about 10 wt. %, alternatively from about 0.4 wt. % to about 8 wt. %, or alternatively from about 0.6 wt. % to about 5 wt. %.

The WSF comprising the FLA can be used in any suitable oil-field operation. In particular, the WSF comprising the FLA can be displaced into a wellbore and used to service the wellbore in accordance with suitable procedures. For example, when the intended use of the WSF is as a drilling fluid, the fluid can be circulated down through a hollow drill stem and out through a drill bit attached thereto while rotating the drill stem to thereby drill the wellbore. The drilling fluid can be flowed back to the surface in a circulatory repetitive path such as to deposit a filter cake on the walls of the wellbore and to continuously carry drill cuttings to the surface. The FLA may be included in the WSF prior to the fluid being placed downhole in a single stream embodiment. Alternatively, the FLA may be mixed with the other components of the WSF during placement into the wellbore, for example, in a two-stream process wherein one stream comprises the FLA and a second stream comprises the other components of the WSF. In an embodiment, the WSF comprising the FLA is prepared at the wellsite. For example, the FLA may be mixed with the other WSF components and then placed downhole. Alternatively, the WSF comprising the FLA is prepared offsite and transported to the use site before being placed downhole.

In an embodiment, a WSF comprising an oil-based mud and a FLA of the type disclosed herein results in a reduction of fluid loss of the WSF where the fluid loss may be determined using a high-temperature high-pressure fluid loss test (HTHP) carried out in accordance with the *Specification for Drilling Fluids Materials*, ANSI/API Specification 13A, Eighteenth Edition, February 2010. In an embodiment, a WSF comprising a FLA as disclosed herein may have a reduction in fluid loss of greater than about 40%, alternatively greater than about 75%, or alternatively greater than about 85% at temperatures of from about 200° F. to about 375° F., alternatively from about 250° F. to about 325° F. or alternatively from about 275° F. to about 300° F. when compared to an otherwise similar WSF lacking a FLA.

EXAMPLE 1

A FLA of the type disclosed herein was prepared by reacting 60 grams of 1-octadecene-co-maleic-anhydride polymer with 40 grams of UNIDYME™ 22 at a temperature of 190° C. for 3 hours. SOLTROL™ 170 (100 grams of isoparaffinic solvent) was utilized as solvent such that heat transfer could be maintained. UNIDYME™ 22 is a dimerized fatty acid commercially available from Arizona Chemicals. The reaction product was used as a FLA in the following examples.

EXAMPLE 2

The effects of the addition of a FLA of the type described herein to an oil-based mud (OBM) on fluid loss were determined. Three base muds were prepared and designated mud 1, mud 2, and mud 3. Mud 1 was a 14 pound per gallon (ppg) diesel oil-based mud containing 2120 g of diesel fuel prepared with a 75:25 oil-to-water ratio (OWR). Mud 2 was a 14 ppg ESCAID™ 110 oil based mud prepared containing 2120 g of ESCAID 110 with a 75:25 OWR. ESCAID 110 hydrocarbon fluid is a petroleum distillate commercially available from EXXON-MOBIL Corp. Mud 1 and Mud 2 additionally contained 75 g of lime, 87.5 g of VG-69™ Clay, 75 g of INVERMUL™ primary emulsifier, 75 g of EZMUL™ emulsifier and 815 g of a 30% $CaCl_2$ brine. VG-69 is an organophillic clay commercially available from Mi SWACO. EZ MUL emulsifier is a polyaminated fatty acid and INVERMUL is a blend of oxidized tall oil and polyaminated fatty acid, both of which are commercially available from Baroid Chemicals. Mud 3 was a 13.0 ppg isomerized olefin (IO) 1518 based mud containing 1548 g of IO 1518 prepared with a 70:30 OWR. Mud 3 additionally contained 60 g of lime, 60 g of VG-69 clay, 80 g of SUREMUL™, 20 g of SUREMOD™ and 944 g of a 30% $CaCl_2$ brine. SUREMUL is a primary emulsifier and SUREMOD liquid rheology modifier is an organic gelling agent, both of which are commercially available from Mi SWACO. Three control samples were prepared, designated Control A, Control B, and Control C, and contained Mud 1, Mud 2, and Mud 3 respectively in the absence of a FLA. Samples 1A, 1B, and 1C contained Mud 1 and PLIOLITE™ DF02, Mud 2 and PLIOLITE DF02, and Mud 3 and PLIOLITE DF02, respectively. PLIOLITE DF02 polymers are fluid loss additives commercially available from ELIOKEM. Samples 2-8 contained an OBM (as indicted by the designation A, B, or C) and the FLA of Example 1. Specifically, Samples 2A-8A contained Mud 1 and the FLA of Example 1, Samples 2B-8B contained Mud 2 and the FLA of Example 1, and Samples 2C-8C contained Mud 3 and the FLA of Example 1. With the exception of sample 7, the reaction product comprising the FLA that was added to the indicated OBM contained 50% solids (i.e., 50% active polymer or FLA in SOLTROL 170). For sample 7, the reaction product comprising the FLA contained 40% solids (i.e., 40% active polymer or FLA in SOLTROL 170). The Brookfield viscosity measurements using a 3LV Spindle, 1.5 rpm at 120° F. for Samples 2-8 are presented in Table 1. Sample 1 which contained PLIOLITE DF02 was a granular product which contained 100% solids (i.e., 100% active polymer).

TABLE 1

| Sample | Brookfield Viscosity (cp) |
|---|---|
| 2 | 1280, 1280 |
| 3 | 1040, 1600 |
| 4 | 819 |
| 5 | 959 |
| 6 | 399 |
| 7 | 160 |
| 8 | 2400 |

The samples were prepared by shearing the samples on a MULTIMIXER™ for 30 minutes utilizing a 9B29X impeller at 11,500 rpm, rolled for 16 hours at 300° F. and then cooled to room temperature (RT). The HTHP fluid loss for each sample was determined as described previously herein and the results for the samples containing a diesel OBM, an ESCAID OBM and an IO OBM are presented in Tables 1A, 1B, and 1C respectively.

TABLE 1A

| Sample | HTHP fluid loss (mL × 2) |
|---|---|
| Control A | 30.8 |
| 1A | 5.7, 7.8 |
| 2A | 9.8, 10.4 |
| 3A | 5.8, 6.0 |
| 4A | 5.7, 13.2 |
| 5A | 3.8, 7.8, 9.0, 8.1 |
| 6A | 15.1, 13.3 |
| 7A | 6.9, 6.0 |
| 8A | 3.0 |

TABLE 1B

| Sample | HTHP fluid loss (mL × 2) |
|---|---|
| Control B | 20.2 |
| 1B | 11.0 |
| 2B | 4.0 |
| 3B | 5.6, 3.3 |
| 4B | 3.0 |
| 5B | 3.8 |
| 6B | 3.2 |
| 7B | 4.5, 3.1 |
| 8B | 4.8 |

TABLE 1C

| Sample | HTHP fluid loss (mL × 2) |
|---|---|
| Control | 9.4 |
| 1C | 5.0 |
| 2C | 3.6 |
| 3C | 3.0 |
| 4C | 4.0 |
| 5C | 4.6 |
| 6C | 3.8 |
| 7C | 4.0 |
| 8C | 5.2 |

In some instances multiple values are presented for a sample and represent repetitive determinations of the same sample. The results demonstrate the ability of an FLA of the type disclosed herein to function as a FLA in a wide variety of OBMs.

ADDITIONAL EMBODIMENTS

The following enumerated embodiments are provided as non-limiting examples:
1. A non-aqueous wellbore servicing fluid comprising a fluid loss additive wherein the fluid loss additive comprises the reaction product of (i) a functional polymer and (ii) an oligomerized fatty acid.
2. A method of conducting an oil-field operation comprising: placing a non-aqueous wellbore servicing fluid downhole wherein the non-aqueous wellbore servicing fluid comprises a fluid loss additive comprising the reaction product of (i) a functional polymer and (ii) an oligomerized fatty acid.
3. The fluid or method of embodiments 1 or 2 wherein the fluid loss additive is present in the wellbore servicing fluid in an amount of from about 0.3 wt. % to about 10 wt. % based on the total weight of the wellbore servicing fluid.
4. The fluid or method of embodiment 1, 2, or 3 wherein the functional polymer comprises a copolymer of maleic anhydride.
5. The fluid or method of embodiment 4 wherein the copolymer of maleic anhydride has maleic anhydride present in an amount of from about 10% to about 90% based on the total weight of the copolymer.
6. The fluid or method of any preceding embodiment wherein the oligomerized fatty acid comprises a dimer acid.
7. The fluid or method of any preceding embodiment wherein the dimer acid is a self-condensation product of two C12-C24 unsaturated fatty acids.
8. The fluid or method of any preceding embodiment wherein the dimer acid is a self-condensation product of two C14-C18 unsaturated fatty acids.
9. The fluid or method of embodiment 7 wherein the C12-C24 unsaturated fatty acids are isolated from tall oil, soybean oil, corn oil, sunflower seed oil, rapeseed oil, canola oil, safflower oil, cuphea oil, coconut oil, palm kernel oil, olive oil, or combinations thereof.
10. The fluid or method of embodiment 7 wherein the C12-C24 unsaturated fatty acids comprise abietic acids, pimaric acids, linoleic acid, linelaidic acid, linolenic acid, or combinations thereof.
11. The fluid or method of any preceding embodiment having a high-temperature high-pressure fluid loss at 300° F. that is reduced by greater than about 40% when compared to an otherwise similar wellbore servicing fluid lacking a fluid loss additive comprising the reaction product of (i) a functional polymer and (ii) a oligomerized fatty acid.

12. The fluid or method of any preceding embodiment wherein the ratio of oligomerized fatty acid to functional polymer in the reaction mixture is from about 1:4 to about 4:1.
13. The fluid or method of any preceding embodiment wherein the ratio of oligomerized fatty acid to functional polymer in the reaction mixture is from about 3:2 to about 2:3.
14. The fluid or method of any preceding embodiment wherein the non-aqueous wellbore servicing fluid comprises hydrocarbons, olefins, internal olefin based oils, mineral oil, kerosene, diesel oil, fuel oil, synthetic oil, linear or branched paraffins, esters, acetals, mixtures of crude oil, derivatives thereof, or combinations thereof.
15. The fluid or method of any preceding embodiment wherein the reaction product is formed by contacting the functional polymer and oligomerized fatty acid to form a reaction mixture and subjecting the reaction mixture to a temperature of from about 100° C. to about 225° C. for a time period of from about 1 hour to about 6 hours.

Without further elaboration, it is believed that one skilled in the art can, using the description herein, utilize the present invention to its fullest extent. While preferred inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. A method of conducting an oil-field operation comprising: placing a non-aqueous wellbore servicing fluid downhole wherein the non-aqueous wellbore servicing fluid comprises a fluid loss additive comprising the reaction product of (i) a functional polymer comprising a maleic anhydride copolymer having a maleic anhydride content of from about 10% to about 90% and (ii) an oligomerized fatty acid wherein the non-aqueous wellbore servicing fluid has a high-temperature high-pressure, fluid loss at 300° F. that is reduced by greater than about 40% when compared to an otherwise similar non-aqueous wellbore servicing fluid lacking a fluid loss additive comprising the reaction product of (i) a functional polymer comprising a maleic anhydride copolymer having a maleic anhydride content of from about 10% to about 90% and (ii) an oligomerized fatty acid.

2. The method of claim 1 wherein the oligomerized fatty acid comprises a dimer acid.

3. The method of claim 1 wherein the reaction product is formed by contacting the functional polymer and oligomerized fatty acid to form a reaction mixture and subjecting the reaction mixture to a temperature of from about 100° C. to about 225° C. for a time period of from about 1 hour to about 6 hours.

4. The method of claim 3 wherein the ratio of oligomerized fatty acid to functional polymer in the reaction mixture is from about 1:4 to about 4:1.

5. The method of claim 1 wherein the fluid loss additive is present in the non-aqueous wellbore servicing fluid in an amount of from about 0.3 wt. % to about 10 wt. % based on the total weight of the non-aqueous wellbore servicing fluid.

6. The method of claim 1 wherein the non-aqueous wellbore servicing fluid comprises hydrocarbons, olefins, internal olefin based oils, mineral oil, kerosene, diesel oil, fuel oil, synthetic oil, linear or branched paraffins, esters, acetals, mixtures of crude oil, derivatives thereof, or combinations thereof.

7. The method of claim 1 wherein the oligomerized fatty acid comprises a dimer acid.

8. The method of claim 7 wherein the dimer acid is a self-condensation product of two 14-C18 unsaturated fatty acids.

9. The method of claim 1 wherein the average molecular weight of the functional polymer is from about 10,000 Daltons to about 500,000 Daltons.

10. The method of claim 1 wherein the maleic anhydride copolymer comprises polystyrene-co-maleic anhydride, poly-1-octadecene-co-maleic anhydride, polyethylene-co-maleic anhydride or combinations thereof.

11. The method of claim 1 wherein the non-aqueous wellbore servicing fluid comprises an oil-based drilling fluid.

12. The method of claim 1 wherein the non-aqueous wellbore servicing fluid comprises an inverse emulsion.

13. The method of claim 1 wherein the non-aqueous wellbore servicing fluid comprises less than about 30% water by weight of the non-aqueous wellbore servicing fluid.

14. The method of claim 1 wherein the non-aqueous wellbore servicing fluid further comprises an emulsifier.

15. The method of claim 11 further comprising:
circulating the oil-based drilling fluid through a hollow drill stem; and
flowing the oil-based drilling fluid back to a surface in a circulatory repetitive path.

16. The method of claim 15 wherein a filtercake is deposited on the walls of the wellbore.

17. The method of claim 1 wherein the non-aqueous wellbore servicing fluid is prepared on-site.

18. The method of claim 1 wherein the reaction product is obtained from a reaction mixture comprising from about 20 wt. % to about 80 wt. % functional copolymer and from about 80 wt. % to about 20 wt. % oligomerized fatty acid.

19. A method comprising:
preparing a nonaqueous wellbore servicing fluid comprising an inverse emulsion and the reaction product of (i) a functional polymer comprising a maleic anhydride copolymer having a maleic anhydride content of from about 10% to about 90% and (ii) an oligomerized fatty acid.

20. The method of claim 19 wherein the non-aqueous wellbore servicing fluid has a high-temperature high-pressure fluid loss at 300° F. that is reduced by greater than about 40% when compared to an otherwise similar non-aqueous wellbore servicing fluid lacking a fluid loss additive comprising the reaction product of (i) a functional polymer comprising a maleic anhydride copolymer having a maleic anhydride content of from about 10% to about 90% and (ii) an oligomerized fatty acid.

* * * * *

UNITED STATES PATENT AND TRADEMARK OFFICE
CERTIFICATE OF CORRECTION

PATENT NO. : 9,034,800 B2
APPLICATION NO. : 13/250882
DATED : May 19, 2015
INVENTOR(S) : Jeffery R. Harris et al.

It is certified that error appears in the above-identified patent and that said Letters Patent is hereby corrected as shown below:

In the Claims

Claim 8, col. 10, line 28, replace "14-C18" with --C14-C18--

Signed and Sealed this
Twenty-sixth Day of April, 2016

Michelle K. Lee
*Director of the United States Patent and Trademark Office*